US011223202B2

(12) United States Patent
Arnold et al.

(10) Patent No.: US 11,223,202 B2
(45) Date of Patent: Jan. 11, 2022

(54) ENERGY MANAGEMENT METHOD FOR AN ENERGY SYSTEM AND ENERGY SYSTEM

(71) Applicant: Viessmann Werke GmbH & Co. KG, Allendorf (DE)

(72) Inventors: Christian Arnold, Neuhof-Rommerz (DE); Bernd Hafner, Allendorf (DE); Daniel Lödige, Marburg (DE); Jan Strubel, Darmstadt (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 175 days.

(21) Appl. No.: 16/483,439

(22) PCT Filed: Feb. 22, 2018

(86) PCT No.: PCT/EP2018/054424
§ 371 (c)(1),
(2) Date: Aug. 4, 2019

(87) PCT Pub. No.: WO2018/158139
PCT Pub. Date: Sep. 7, 2018

(65) Prior Publication Data
US 2020/0014210 A1    Jan. 9, 2020

(51) Int. Cl.
*H02J 3/14*    (2006.01)
*H02J 3/32*    (2006.01)
(Continued)

(52) U.S. Cl.
CPC .................. *H02J 3/32* (2013.01); *G05B 6/02* (2013.01); *H02J 3/14* (2013.01); *H02J 3/383* (2013.01);
(Continued)

(58) Field of Classification Search
CPC ...... H02J 3/32; H02J 3/14; H02J 3/383; H02J 7/35; H02J 3/003; H02J 2310/14;
(Continued)

(56) References Cited

U.S. PATENT DOCUMENTS

| 2007/0043478 | A1* | 2/2007 | Ehlers | F24F 11/30 |
| | | | | 700/276 |
| 2009/0152947 | A1* | 6/2009 | Wang | H02J 7/35 |
| | | | | 307/24 |

(Continued)

FOREIGN PATENT DOCUMENTS

| DE | 102009040090 A1 | 3/2011 |
| DE | 102010001874 A1 | 8/2011 |

(Continued)

OTHER PUBLICATIONS

International Search Report dated May 14, 2018 for PCT App. Ser. No. PCT/EP2018/054424.
(Continued)

*Primary Examiner* — Christopher E. Everett
(74) *Attorney, Agent, or Firm* — Henricks Slavin LLP

(57) ABSTRACT

The present invention relates to an energy management method for an energy system (1) in a building. The energy system (1) comprises a plurality of uncontrollable energy consumers (HH), at least one controllable energy consumer (WP), an energy storage device (BAT), a net connection point (NAP) through which energy can be drawn from the net and/or fed into the net, and a feedback-control or control device (EMS) which is designed to feedback-control or control the at least one controllable energy consumer (WP) and the energy storage device (BAT). The plurality of uncontrollable energy consumers (HH) is configured to draw energy from the net or from the energy storage device (BAT). The method comprises the following steps: detecting a current state of charge ($SOC_{act}$) of the energy store device (Continued)

(BAT), defining a period of time ($\Delta T_0$) during which the uncontrollable energy consumers (HH) are supplied with energy from the energy storage device, determining a limit value ($SOC_{high}$) of the state of charge of the energy storage device (BAT) on the basis of a determined minimum energy demand of the plurality of uncontrollable energy consumers (HH) up to the time of charging ($T_0$), operating the at least one controllable energy consumer (WP) with energy from the energy storage device (BAT) if the current charge state ($SOC_{act}$) of the energy storage device (BAT) is greater than the determined limit value ($SOC_{high}$) of the charge state and operating the at least one controllable energy consumer (WP) with energy from the net if the current charge state ($SOC_{act}$) of the energy storage device (BAT) is less than or equal to the determined limit value ($SOC_{high}$) of the charge state.

13 Claims, 3 Drawing Sheets

(51) Int. Cl.
*G05B 6/02* (2006.01)
*H02J 3/38* (2006.01)
*H02J 7/35* (2006.01)
*H02J 3/00* (2006.01)

(52) U.S. Cl.
CPC ............ *H02J 7/35* (2013.01); *H02J 3/003* (2020.01); *H02J 2310/14* (2020.01)

(58) Field of Classification Search
CPC .... H02J 3/381; H02J 2300/24; H02J 2310/12; G05B 6/02; Y04S 20/242; Y04S 20/222; Y02B 70/30; Y02B 10/10; Y02B 70/3225; Y02E 10/56; Y02E 70/30
See application file for complete search history.

(56) References Cited

U.S. PATENT DOCUMENTS

| | | | | |
|---|---|---|---|---|
| 2011/0068624 | A1* | 3/2011 | Dibachi | H02J 7/00 307/18 |
| 2011/0148195 | A1* | 6/2011 | Lee | H02J 9/061 307/25 |
| 2013/0162037 | A1* | 6/2013 | Kim | H02J 3/32 307/24 |
| 2014/0222237 | A1 | 8/2014 | Hibiya et al. | |
| 2014/0337002 | A1* | 11/2014 | Manto | G06Q 50/06 703/18 |
| 2015/0350391 | A1 | 12/2015 | Miyake et al. | |
| 2016/0105023 | A1* | 4/2016 | De Ridder | H02J 3/24 700/295 |

FOREIGN PATENT DOCUMENTS

| | | |
|---|---|---|
| DE | 102010002914 A1 | 9/2011 |
| DE | 202014003951 U1 | 6/2014 |
| JP | 2017005851 A | 1/2017 |
| WO | WO 2013190603 A1 | 12/2013 |

OTHER PUBLICATIONS

Weniger, Johannes et al., "Save Solar Power Forecast Based," Sonne Wind & Wärme, pp. 68-69 (Sep. 2015).
Examination Report dated Apr. 29, 2021 for corresponding German App. Ser. No. 10 2017 203 249.9 with English language machine translation.

* cited by examiner

ENERGY MANAGEMENT METHOD FOR AN ENERGY SYSTEM AND ENERGY SYSTEM

The present invention relates to an energy management method for an energy system in a building and to an energy system. In particular, an energy management method shall be provided to keep in stock in an energy storage device an energy reserve sufficient for a predetermined period of time for energy consumers in order to avoid or minimize the consumption of energy from a public net.

The objective of energy management is to make the generation and consumption of energy in a building as efficient as possible. Another objective can be to minimize the consumption of energy from a public net. In particular when using renewable energy sources, such as photovoltaic systems or wind turbines, energy production depends on the position of the sun and/or the weather, so that at certain times of the day there may be an oversupply of energy, while at other times of the day, e.g. in the evening or at night, there can be an increased energy demand.

Johannes Weniger, Joseph Bergner, Tjarko Tjaden and Volker Quaschning from the Hochschule für Technik und Wirtschaft HTW Berlin describe in the article "Solarstrom prognosebasiert speichern", published in September 2015 in SONNE WIND & WÄRME, pages 68 to 69, methods for the forecast-based storage of solar electricity in order to avoid curtailment losses. The charging of an energy storage device is postponed until midday, when the photovoltaic system (PV system) generates the most energy.

As shown in the above article, an energy system with an energy storage device and a renewable energy source can be operated as efficiently as possible if the energy storage device is charged on the basis of a calculation of the expected energy production by the renewable energy source. The efficiency of operation can be further increased by also discharging the energy storage device on the basis of a calculation or estimate of the expected energy consumption. The aim here is to ensure that at times of the day when the renewable energy source does not provide any energy, sufficient energy is available in the energy storage device to supply energy to energy consumers in the energy system. The present invention solves this problem by a method according to claim 1 and an energy system according to claim 8.

The present invention relates to an energy management method for an energy system in a building. The energy system has a plurality of uncontrollable energy consumers and at least one controllable energy consumer. The energy system has an energy storage device for storing energy and a net connection point through which energy can be drawn from the net and/or fed into the net. The energy system also includes a feedback-control or control device which is designed to control the at least one controllable energy consumer and the energy storage device. The plurality of uncontrollable energy consumers is configured to draw energy from the net or from the energy storage device.

In a first method step, a current state of charge of the energy storage device is detected. The feedback-control or control device can be connected to the energy storage device for data exchange via wired or wireless communication lines in order to detect the current state of charge of the energy storage device. In addition, the feedback-control or control device can send feedback-control or control signals to the energy storage device and to the at least one controllable energy consumer. In addition, the energy system can comprise inverters controllable by the feedback-control or control device. Furthermore, the energy system can have a plurality of sensors, for example for measuring energy consumption, which transmit corresponding measurement signals to the feedback-control or control device.

In a further method step, a period of time is defined during which the uncontrollable energy consumers are supplied with energy from the energy storage device. In particular, the uncontrollable energy consumers shall be supplied exclusively with energy from the energy storage device during the specified period. The period can be fixed or can be predetermined on the basis of parameters. Preferably, the period can be specified on the basis of the operating parameters of a renewable energy source. If, for example, the energy system includes a photovoltaic system for charging the energy storage device, the period of time can be determined on the basis of the points in times of sunset and sunrise. The period of time can be determined particularly advantageously in such a way that the uncontrollable energy consumers can be supplied with energy from the energy storage device at least up to the next possible charging operation of the energy storage device. The period of time is preferably defined within a prediction horizon of up to 24 hours.

In a further step, an energy demand of the large number of uncontrollable energy consumers can be determined or estimated during the specified period of time $\Delta T_0$. The estimation of the energy demand can, for example, be carried out on the basis of logged consumption data from the past. Alternatively or additionally, a model calculation can be carried out to estimate the energy demand. The determination of the energy demand can be carried out either by the feedback-control or control device or by a remote computer or server connected e.g. via the Internet. In order to improve the accuracy of the determined value of the energy demand, the method can have information on the uncontrollable energy consumers, such as their number, their minimum, maximum and/or average power consumption and/or typical times during a day when the respective energy consumers are used.

Data such as the day of the week or the date can also be taken into account in the calculation, since, for example, a different consumption pattern is to be expected on weekends or public holidays than on working days. In addition, certain consumers are more likely to be used on cold or hot days, so that weather information can also be taken into account in addition to pure date information. Furthermore, the energy system can be configured to use presence information about the users or occupants of the building. This information can be generated by the users themselves, for example via sensors, consumption patterns and/or an app or another user interface with the energy system.

In a further method step, a limit value for the state of charge of the energy storage device is determined on the basis of a determined energy demand of the plurality of uncontrollable energy consumers during the period of time. When determining the limit value, an efficiency of charging and/or discharging the energy storage device can also be taken into account. Furthermore, the limit value can also be determined on the basis of a safety reserve to have available. This can happen, for example, in the event of unforeseen energy consumption.

If the current state of charge of the energy storage device is greater than the determined limit value of the state of charge, the at least one controllable energy consumer is operated with energy from the energy storage device. This means that as long as the energy storage device has a charge state that is above the limit value, the stored energy can also be used to operate the at least one controllable energy consumer. This can reduce or avoid the consumption of energy from the public net to operate the at least one controllable energy consumer. The operation of the at least one controllable energy consumer on the basis of the limit value takes place in particular during the specified period of time.

If the current state of charge of the energy storage device is less than or equal to the determined limit value of the state of charge, the at least one controllable energy consumer is operated with energy from the net. This is intended to ensure that the energy demand of the uncontrollable energy consumers can be supplied by the energy storage device. In particular, if the at least one controllable energy consumer has a separate electricity meter for a reduced electricity rate, it can be advantageous to operate the controllable energy consumer with electricity from the public net. The operation of the at least one controllable energy consumer on the basis of the limit value takes place in particular during the specified period.

Uncontrollable energy consumers are energy consumers that cannot be controlled by the feedback-control or control device. They are switched on and off by users or residents of the building, or switch themselves on and off automatically, such as a refrigerator or lights that are controlled by motion sensors. Uncontrollable energy consumers can also be other conventional household appliances that consume electricity, such as lamps, consumer electronics, kitchen appliances, etc.

A controllable energy consumer can be switched on and off by the feedback-control or control device so that at least the point in time of the consumption of the controllable energy consumer can be predetermined by the feedback-control or control device. Furthermore, the power input of the controllable energy consumer can be feedback-controlled or controlled by the feedback-control or control device. However, at least the feedback-control or control device knows which maximum and minimum power input is to be expected by the controllable energy consumer. A controllable energy consumer can be, for example, a heat pump, a night storage heater, a device for ventilating at least one room, an air conditioning system, a charging station for an electric vehicle or a controllable washing machine.

In particular, the energy storage device can be configured to store electrical energy. In principle, however, the invention can also be applied to systems with an energy storage device that stores energy in the form of heat or mechanical energy, for example in the form of kinetic energy (e.g. through a flywheel) or potential energy.

Preferably at least one controllable energy consumer is a heat pump. The operation of the heat pump can, for example, be feedback-controlled or controlled by the feedback-control or control device. A heat pump can be used to heat and/or cool a carrier medium in order to heat and/or cool rooms in the building. The heat pump can also be coupled with a hot and/or cold water storage tank so that energy can also be stored in the form of heat and/or cold.

It is also preferred for the at least one controllable energy consumer with a separate electricity meter to be connected to the public net via the net connection point. This means that energy can be obtained at a particularly favorable rate for the controllable energy consumer. For example, particularly favorable heat pump electricity rates are offered for heat pumps.

The energy system can also include a renewable energy source such as a photovoltaic system (PV system) or a wind turbine configured to supply energy to the (controllable and uncontrollable) energy consumers and energy storage device. The photovoltaic system usually has an inverter which is configured to convert the direct current generated by the PV system into alternating current. The inverter can, for example, be controlled by the feedback-control or control device. In addition, the PV system can include an electricity meter to measure the amount of energy produced. In particular, part of the generated energy can be used to charge the energy storage device. Furthermore, energy from the PV system can be fed into the public net via the net connection point. The energy fed in is measured to calculate the remuneration.

The energy storage device can preferably only be charged by the renewable energy source, such as the photovoltaic system. This is to prevent energy from the public net from being used to charge the energy storage device, as the rate for drawing energy from the public net is generally much higher than the remuneration rate for feeding energy from the renewable energy source into the public net.

The feedback-control or control device can be connected to the Internet to receive a solar radiation forecast to determine an estimate of the energy generation by the photovoltaic system. The forecast of the solar radiation can also be generated by a weather forecast. For this purpose, updated data can be transmitted to the feedback-control or control device at regular intervals. Alternatively, the feedback-control or control device can receive an estimated value of the energy production by the photovoltaic system from a central server via the Internet. If a renewable energy source other than a PV system is used, a corresponding estimated value of the energy production can be determined locally by the feedback-control or control device or received from a central server via the internet. For a wind turbine, a suitable weather forecast or measured wind speeds can be used to determine the estimated value of the energy production.

The feedback-control or control device can be configured to log consumption data from the uncontrollable energy consumers in order to obtain an estimated value of the energy demand of the uncontrollable energy consumers on the basis of the logged data. For this purpose, the feedback-control or control device can comprise a suitable data memory or be connected to a suitable storage medium. Alternatively, the feedback-control or control device can transmit the consumption data to a central server via the internet for the purpose of logging.

According to the invention, the object is also achieved by an energy system in a building. The energy system comprises at least a plurality of uncontrollable energy consumers, at least one controllable energy consumer, an energy storage device, a net connection point through which energy can be drawn from the net and/or fed into the net, and a feedback-control or control device which is designed to control the at least one controllable energy consumer and the energy storage device.

The plurality of uncontrollable energy consumers is configured to draw energy from the net and/or the energy storage device. Furthermore, the energy consumers can be configured to obtain energy from a renewable energy source. The energy source from which the energy consumers draw energy can be controlled by the feedback-control or control device.

The feedback-control or control device is configured to detect a current state of charge of the energy storage device. The feedback-control or control device is also configured to define a period of time during which the uncontrollable energy consumers are supplied with energy from the energy storage device. In particular, the uncontrollable energy consumers shall be able to obtain energy only from the energy storage device during the predetermined period of time.

The feedback-control or control device is also configured to determine a limit value for the state of charge of the energy storage device on the basis of a determined energy demand of the plurality of uncontrollable energy consumers during the predetermined period of time.

The feedback-control or control device is also configured to operate the at least one controllable energy consumer with energy from the energy storage device and, if the current state of charge of the energy storage device is greater than the determined limit value of the state of charge, to operate the at least one controllable energy consumer with energy from the net if the current state of charge of the energy storage device is less than or equal to the determined limit value of the state of charge.

BRIEF DESCRIPTION OF THE DRAWINGS

Further advantageous embodiments are described in more detail below on the basis of an exemplary embodiment which is shown in the drawings but to which the invention is not limited.

The drawings show schematically.

DETAILED DESCRIPTION OF THE INVENTION BY MEANS OF EXEMPLARY EMBODIMENTS

In the following description of a preferred embodiment of the present invention, identical reference signs designate identical or comparable components.

Figure 1:
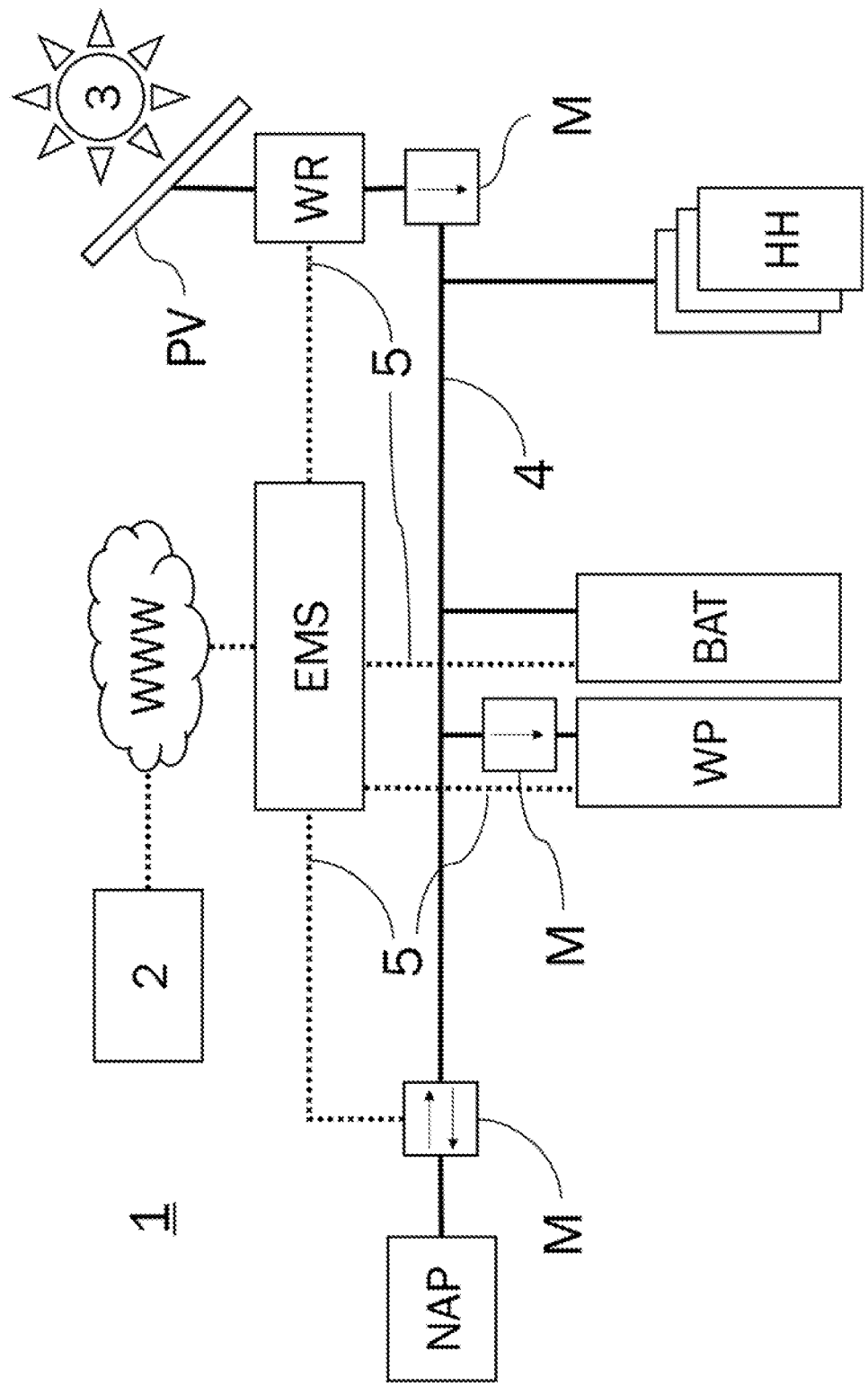
FIG. 1 shows an energy system according to a first exemplary embodiment of the invention.

FIG. 1 shows a highly simplified schematic representation of a first exemplary embodiment of an energy system 1 according to the invention in a building. The illustrated energy system 1 comprises a photovoltaic system PV (hereinafter also abbreviated as PV system), which converts radiant energy from the sun 3 into electrical energy. The energy system 1 can use other renewable energy sources, such as a wind turbine, instead of a PV system or in addition to the PV system. An inverter WR converts the direct current generated by the PV system into alternating current that can be used by consumers. The thick solid lines illustrate the internal electricity net 4 of the building and dotted lines illustrate communication lines 5 for data traffic, for example for controlling, feedback-controlling and/or exchanging data with a server 2 via the Internet WWW or in an intranet or a cloud.

The internal electricity net 4 of the building is connected to a public electricity net via a net connection point NAP. An electricity meter M measures the energy consumption drawn from the public net by the internal electricity net 4 and the amount of energy (or produced power integrated over time) fed into the public net by the internal electricity net 4.

The energy system 1 comprises an energy storage device BAT, which can consist of batteries or rechargeable batteries, for example. The energy storage device BAT comprises an inverter that converts alternating current from the electricity net 4 into direct current to charge the energy storage device BAT. The inverter can also convert direct current from the energy storage device BAT into alternating current.

In order to charge the energy storage device BAT with energy from the PV system, a direct power line can also be provided between the PV system and the energy storage device BAT, so that a conversion from direct current to alternating current and vice versa is not necessary.

Another component of the energy system 1 is a heat pump WP as a controllable energy consumer. The operation of the heat pump WP can be feedback-controlled or controlled by a feedback-control or control device EMS. With an SGReady heat pump, it is also possible to have the operation of the heat pump WP controlled by an external signal from the net operator. The energy system 1 can also include other controllable energy consumers. For example, a washing machine can be controlled by the feedback-control or control unit EMS. Furthermore, a ventilation system and/or a night storage heater can be provided as controllable energy consumers.

A plurality of uncontrollable energy consumers HH are connected to the internal electricity net 4 of the building. The uncontrollable energy consumers HH are, for example, household appliances that are switched on and off by a user or occupant of the building. The energy demand of the uncontrollable energy consumers HH shall preferably be covered directly by the PV system, so that the generated energy can be consumed directly without intermediate storage. Direct consumption is particularly efficient because losses due to charging and discharging the energy storage device BAT are avoided. If the output produced by the PV system is not large enough to cover the demand of the uncontrollable energy consumers HH, the uncontrollable energy consumers HH shall be supplied with energy by the energy storage system BAT. If the demand of the uncontrollable energy consumers HH cannot be met by the PV system or the energy storage device BAT, energy can also be obtained from the public net via the net connection point NAT. The more efficiently the energy system 1 is operated, the less energy has to be drawn from the public net.

An electricity meter M measures the energy provided by the PV system. The heat pump WP can have a separate electricity meter M, so that energy can be obtained from the public net at a particularly favorable rate. One objective of the energy management is therefore to obtain energy from the public net preferably for the operation of the heat pump WP if the energy demand cannot be covered by the PV system. The uncontrollable energy consumers HH shall preferably be supplied with energy from the PV system or from the energy storage device BAT.

The feedback-control or control device EMS is connected via communication lines 5 to the inverter WR of the PV system, to the heat pump WP, to the energy storage device BAT, to the electricity meter M at the net connection point NAP and to the internet WWW. Instead of communication lines 5, wireless communication can also be provided between the feedback-control or control device EMS and the above-mentioned components of the energy system 1.

The energy system 1 can be operated in four different operating states depending on the output produced by the PV system and the state of charge of the energy storage device BAT. In all operating states, the heat pump WP can be supplied directly by the PV system, provided that sufficient output is produced by the PV system. In addition, the uncontrollable energy consumers HH shall be supplied directly by the PV system. Thus, the energy generated by the PV system shall be used directly if possible, without intermediate storage of the energy.

A first operating state B1 is present if a current state of charge of the energy storage device BAT $SOC_{act}$ is less than a defined lower limit $SOC_{high}$ of the state of charge. SOC stands for "State of Charge". The lower limit value $SOC_{high}$ is used to ensure that the energy storage device BAT is sufficiently charged to supply energy from the energy storage device BAT to the uncontrollable energy consumers HH after sunset and before sunrise. In the first operating state B1, the energy storage device BAT shall be charged by the PV system if possible. The heat pump WP must not be supplied by the energy storage device BAT. If possible, the uncontrollable energy consumers HH shall be supplied by the energy storage device BAT. Only when the energy storage device BAT is empty shall the uncontrollable energy consumers HH be supplied with electricity from the public net.

A second operating state B2 exists if the current charge state of the energy storage device BAT $SOC_{act}$ is higher than the lower limit value $SOC_{high}$ but lower than an upper limit value $SOC_{max}$. The upper limit $SOC_{max}$ can fulfil two different functions. On the one hand, it is used to have available sufficient capacity in the energy storage device BAT to charge the energy storage device BAT during the power peaks of the PV system so that curtailment losses can be avoided. Furthermore, the upper limit value $SOC_{max}$ is used to limit the loading of the energy storage device BAT to a value which is favorable for the service life of the energy storage device BAT. Certain energy storage devices BAT for electrical energy, such as batteries or rechargeable batteries, should not be charged to full capacity for very long periods of time, as this can have negative effects on the service life. If the energy consumption of the uncontrollable energy consumers HH drops drastically for several days or weeks, for example because the occupants or users of the building are on holiday, the upper limit value $SOC_{max}$ can be used to prevent the energy storage device from being charged to 100% during this period. For example, the upper limit value $SOC_{max}$ for such a period can be set to a value between 50% and 70%. Thus, with a low expected demand of the controllable energy consumers WP and the uncontrollable energy consumers HH, the loading of the energy storage device BAT can be limited to the amount of energy required to supply the energy consumers WP, HH. In the second operating state B2, the energy storage device BAT shall be charged by the PV system. Both the heat pump WP and the uncontrollable energy consumers HH may be supplied by the energy storage device BAT.

The energy system 1 is operated in a third operating state B3 when the upper limit value $SOC_{max}$ of the state of charge is reached and the PV system does not operate at the maximum power due to cloudiness. In this state, the energy storage device BAT must not be charged by the PV system. Both the heat pump WP and the uncontrollable energy consumers HH may be supplied by the energy storage device BAT.

The fourth operating state B4 occurs when the upper limit value $SOC_{max}$ of the state of charge is reached and the sun is shining, so that the PV system produces energy near its maximum output. In this state, the energy storage device BAT may or can no longer be charged by the PV system. Since the PV system delivers a high electrical output, the heat pump WP shall primarily be operated directly with energy from the PV system. Neither the heat pump WP nor the uncontrollable energy consumers HH may be supplied by the energy storage device BAT.

An algorithm which determines the four operating states B1 to B4 by comparing the current state of charge $SOC_{act}$ with the defined limit values $SOC_{max}$ and $SOC_{high}$ as well as the current power produced by the PV system, is implemented in the feedback-control or control device EMS.

Figure 2:
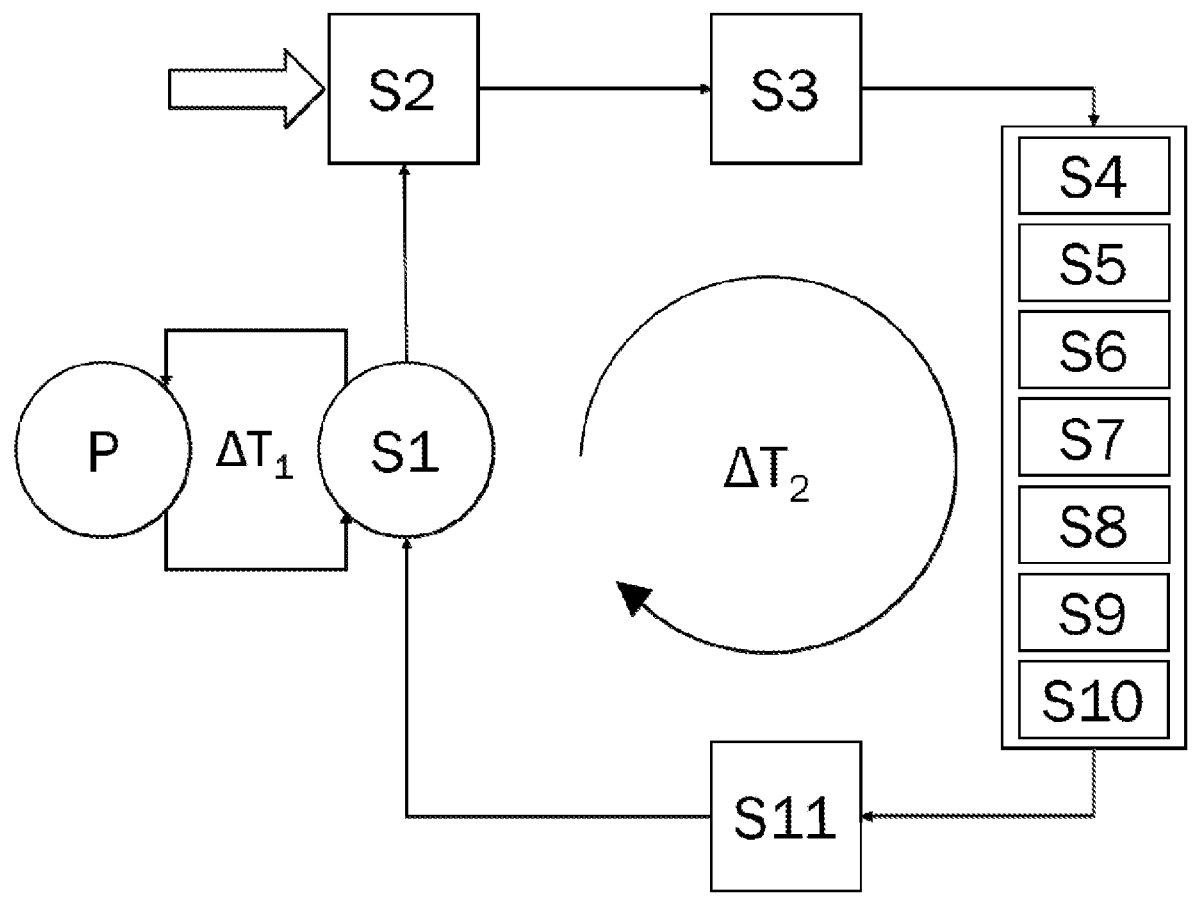
FIG. 2 shows a flow chart of a second exemplary embodiment of the invention.

FIG. 2 shows a flow chart of a method for an energy management according to an exemplary embodiment of the invention. The method allows an overnight reserve of an energy storage device BAT to be calculated for the power consumption in a building and to be held available accordingly in order to avoid the purchase of energy from the public net. This ensures a particularly efficient operation of a PV system. It is also possible to ensure that the service life of the energy storage device BAT remains as long as possible, since a long operation in unfavorable charge areas can be avoided by setting charge limit values.

The circle on the left symbolizes a method P, which, for example, stands for the operation of an energy system in a building. The energy system can, for example, be an energy system with a PV system, an energy storage device (battery) and a heat pump WP, as described in the first exemplary embodiment. The energy management method can be carried out by a feedback-control or control device EMS, for example.

With a time constant $\Delta T_1$ the method P is monitored by the feedback-control or control device EMS S1. It is thus checked whether correcting variables in the energy system 1 are observed on the basis of the operating states B1 to B4. This step S1 can be performed every second, for example.

In the next step, S2, a time series is read in to determine an estimated value of the energy generation by the PV system. For example, weather data for the next 24 hours can be received as a time series via the internet. For example, if a smaller prediction horizon is used, the weather data can also only be received for the next 8 or 12 hours. The weather data can then be used to determine an estimated value of the energy production by the PV system. Important parameters of the weather data are, for example, the expected hours of sunshine, the degree of cloud cover and the position of the sun. This data can, for example, be read in as time series. The time resolution of the time series then determines the temporal resolution of the resulting temporal course of the determined energy generation. Other parameters, such as the time of sunrise and sunset, can also be stored in a memory.

Accordingly, a data time series can also be read in to determine the expected energy consumption. For this purpose, a data memory with logged consumption data in the feedback-control or control device EMS can be provided. If the consumption data is stored on a server (or in the cloud), the data can be retrieved via an internet connection.

Step S3 starts the energy management method, which comprises steps S4 to S10. The method can, for example, be executed on a processor of the feedback-control or control device EMS. Alternatively, the method can also be carried out on an external server accessible via the internet, so that less computing power must be available locally. Running on a server also has the advantage that a plurality of feedback-control or control devices EMS can access the method and the method can be improved or updated without the need for local corresponding action.

In the first step S4, the theoretical net consumption only by uncontrollable energy consumers is calculated as a time series. This consumption is also referred to as household current. For this purpose, a time series of the electrical power demand of the uncontrollable energy consumers is calculated which exceeds the power provided by the PV system. The calculation is performed for each time step within the prediction horizon. For example, a time step can be 10 to 15 minutes long. The prediction horizon can range e.g. from 12 to 24 hours, so that it covers a complete charge and/or discharge cycle of the battery. The determined consumption is multiplied by the discharge efficiency of the battery, i.e. the energy storage device.

In the second step, S5, the theoretical net consumption of all energy consumers is calculated. This includes the consumption of controllable and uncontrollable energy consumers, i.e. e.g. the consumption by a heat pump and the household electricity. The calculation is again carried out as a time series. For this purpose, a time series of the electrical power demand of all electrical consumers including the heat pump is calculated which exceeds the power provided by the PV system. The calculation is performed for each time step within the prediction horizon. The determined consumption is multiplied by the discharge efficiency of the battery, i.e. the energy storage device.

In the third step of method S6, the expected surplus of the electrical power (or energy) generated by the PV system is calculated as a time series. A time series of the average excess power of the PV system (power of the PV system minus the sum of the estimated power consumed by all consumers) is calculated for each time step within the prediction horizon and multiplied by the charging efficiency of the battery so that losses occurring when charging the battery are taken into account.

In the following step, S7, the minimum amount of energy to be held available in the energy storage device BAT for the household electricity is calculated as a time series. A limit value $SOC_{high}$ of the state of charge of the energy storage device BAT can be determined from the minimum amount of energy to be held available for the household electricity (see S9). Until the limit value $SOC_{high}$ of the state of charge is reached, controllable energy consumers, such as the heat pump WP, can also obtain energy from the energy storage device BAT. If the limit value $SOC_{high}$ is reached or is gone below, only the uncontrollable energy consumers are supplied by the energy storage device BAT.

The calculation of the minimum amount of energy to be held available in the energy storage device can, for example, be performed by a backward discrete integration of the difference of the calculated time series from steps S4 and S6 from the time of the last occurrence of net consumption within the prediction horizon. The integral is here limited to energetically permissible values so that the storage capacity of the energy storage device BAT does not assume any values below 0% or above 100%. In particular, the amount of energy to be held available is determined up to a point in time $T_0$ within the prediction horizon in which the energy storage device BAT can be recharged.

For example, the period of time $\Delta T_0$ can be determined on the basis of the position of the sun, in particular on the basis of the points in time of sunset and sunrise, so that the period of time $\Delta T_0$ substantially depends on the duration of the night. For example, the period of time $\Delta T_0$ can depend on the energy generation of the PV system. In particular, the period of time $\Delta T_0$ is defined in such a way that sufficient energy is held available in the energy storage device BAT to supply the energy consumers HH with energy until the energy consumers HH can again be supplied with energy from the PV system. The limit value $SOC_{high}$ is therefore essentially used to ensure the energy supply of the uncontrollable energy consumers HH during a period of time in which no energy is provided by the renewable energy source, i.e. e.g. at night when a PV system cannot generate any energy.

In a further step, S8, the maximum amount of energy required for the household electricity and the heat pump WP can be calculated as a time series. The calculation can, for example, be performed by a backward discrete integration of the difference of the calculated power time series from steps S5 and S6 within the prediction horizon. The integral is here limited to energetically permissible values so that the storage capacity of the energy storage device BAT does not assume any values below 0% or above 100%.

In step S9, the limit value $SOC_{high}$ can be derived from the result of the calculation in step S7. The limit value $SOC_{high}$ is determined on the basis of the determined energy demand of the energy consumers during the period of time $\Delta T_0$. The limit value $SOC_{high}$ can be determined for each time step within the prediction horizon. In particular, the limit value $SOC_{high}$ can reach a minimum of 0% at the end of the $\Delta T_0$ period.

In a further step, S10, an upper limit value $SOC_{max}$ for the charge state of the energy storage device BAT can additionally be determined on the basis of the determined course of energy generation by the PV system and/or on the basis of the expected consumption of the energy generators in the predetermined period $\Delta T_0$ as well as in the prediction horizon. On the one hand, this limit value $SOC_{max}$ can ensure that sufficient capacity is available during the day for the expected power peaks of the PV system when charging the energy storage device BAT, so that curtailment losses can be avoided. On the other hand, the upper limit value $SOC_{max}$ can be used to limit the state of charge of the energy storage device BAT to a maximum value which is favorable for its service life.

The upper limit value $SOC_{max}$ can be calculated for each time step within the prediction horizon. For example, the upper limit value $SOC_{max}$ can be determined in such a way that it reaches a maximum value of 100% at sunset when no further energy production by the PV system can be expected until the next day, or a maximum value between 50% and 70% when the expected consumption of the uncontrollable energy consumers HH is so low that a permanent state of charge close to 100% shall be avoided in order not to negatively influence the service life of the energy storage device BAT.

After the method was carried out with steps S4 to S10, the calculated control variables, in particular the limit values $SOC_{high}$ and $SOC_{max}$, can be output in step S11. The entire procedure is performed cyclically at intervals of $\Delta T2$ of e.g. 10 or 15 minutes.

Figure 3:
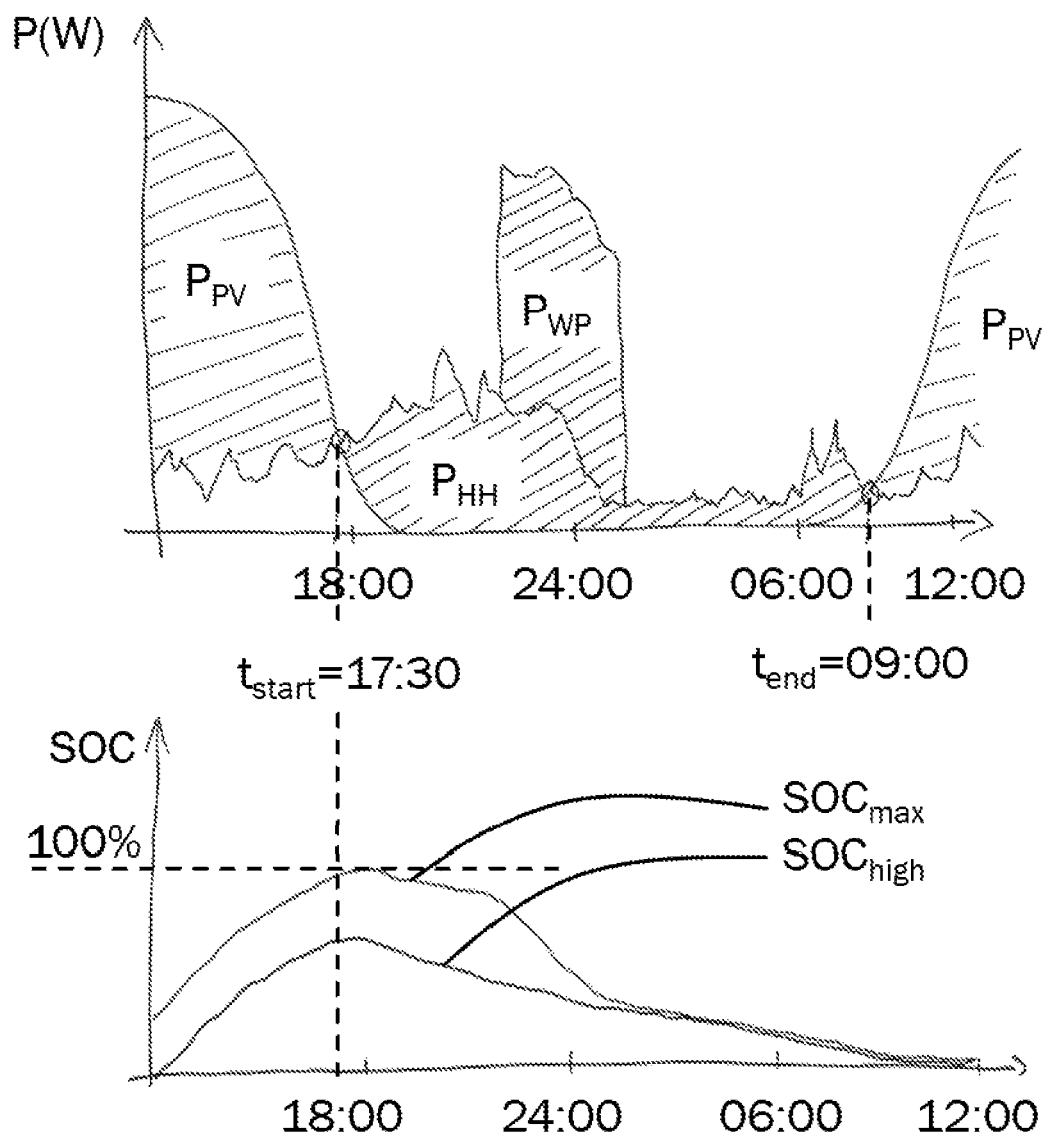
FIG. 3 shows characteristic curves of the consumed and generated electrical power and the state of charge of the energy storage device in an energy system according to the first exemplary embodiment.

FIG. 3 shows a time curve of the power $P_{PV}$ generated by the PV system, the power $P_{WP}$ consumed by the heat pump WP and the power $P_{HH}$ consumed by the uncontrollable energy consumers (household electricity) over a prediction horizon of 24 hours.

At 5:30 p.m., the output $P_{PV}$ generated by the PV system PV drops below the consumption $P_{HH}$ of the uncontrollable energy consumers. This point in time is referred to as $t_{start}$ in FIG. 3. From this point on, energy must be drawn from the energy storage device BAT to cover the household electricity $P_{HH}$. At the point in time $t_{start}$, in particular, the defined period $\Delta T_0$ begins. From approximately 6:30 p.m., i.e. after sunset, the PV system no longer delivers any power ($P_{PV}=0$ W), so that the household electricity $P_{HH}$ must be provided completely by the energy storage device BAT.

At about 6:00 a.m. the sun rises in the exemplary temporal course of the energy consumption and the energy production shown in FIG. 3. The output $P_{PV}$ provided by the PV system begins to rise slowly from 0 W. The point in time at which the power $P_{PV}$ generated by the PV system again exceeds the power $P_{HH}$ consumed by the uncontrollable energy consumers is referred to in FIG. 3 as $t_{end}$ (at about 9:00 a.m.). This point in time essentially corresponds to the end of the predetermined period $\Delta T_0$. However, this is not necessarily the point in time at which a charging process of the energy storage device BAT is started. In order to avoid curtailment losses, it can be advantageous to charge the energy storage device BAT only when there is a high excess power $P_{PV}$ over the consumption $P_{HH}$ (e.g. at noon). In the meantime, the excess power ($P_{PV}-P_{HH}$) can be fed into the public electricity net.

The area below the $P_{HH}$ curve is a measure of the amount of energy consumed via the household electricity (by the uncontrollable energy consumers HH). In order not to have to draw any additional energy from the net until the point in time at about 9:00 a.m., the energy storage device BAT shall hold available the necessary amount of energy in stock. For this purpose, the lower limit value $SOC_{high}$ for the state of charge is calculated as described above. The limit value $SOC_{high}$ substantially results from the determined energy consumption for the household electricity $P_{HH}$ (area below the $P_{HH}$ curve) during the defined period of time $\Delta T_0$ in the prediction horizon multiplied by a discharge efficiency of the energy storage device BAT. In addition, a defined amount of energy can be stored as an emergency reserve. In this case, the limit value $SOC_{high}$ can be increased accordingly.

In a period around midnight (12:00 p.m.), the heat pump WP (with the power consumption $P_{WP}$) is operated in the exemplary power curve shown. If the current state of charge of the energy storage device BAT is above the $SOC_{high}$ limit value during this period, energy from the energy storage device BAT can be used to operate the heat pump WP. If the $SOC_{high}$ limit value is reached, or if it is gone below, the heat pump is operated with energy from the public electricity net. In particular, if the heat pump WP is connected to the public electricity net via a separate electricity meter, a particularly favorable heat pump rate can be used.

If the energy demand of the household electricity $P_{HH}$ has been correctly determined, the state of charge of the energy storage device BAT should never fall below the limit value $SOC_{high}$ since it is updated and reduced accordingly at each calculation step. At the point in time $t_{end}$, which substantially corresponds to the end of the predetermined period $\Delta T_0$, the limit value $SOC_{high}$ is at or close to 0%. The calculation can be performed every 10 or 15 minutes as described above.

The features disclosed in the above description, claims and drawings can be relevant, either individually or in any combination, to realize the invention in its various embodiments.

LIST OF REFERENCE SIGNS 1 energy system
2 server
3 sun
4 internal electricity net
5 communication lines
PV photovoltaic system (PV system)
WP controllable energy consumer (heat pump)
BAT energy storage device
NAP net connection point
WWW internet
EMS feedback-control or control device
M electricity meter
WR inverter
HH uncontrollable energy consumer (household appliance)

The invention claimed is:
1. An energy management method for an energy system (1) in a building, the energy system (1) including
a plurality of uncontrollable energy consumers (HH) that cannot be switched on or off by the energy management method,
at least one controllable energy consumer (WP) that can be switched on and off by the energy management method,
an energy storage device (BAT) having a discharge efficiency,
a net connection point (NAP) through which energy can be drawn from a net and/or fed into the net, and
a feedback-control or control device (EMS) designed to feedback-control or control the at least one controllable energy consumer (WP) and the energy storage device (BAT),
wherein the plurality of uncontrollable energy consumers (HH) is configured to draw energy from the net or from the energy storage device (BAT),
the method comprising the steps of:
detecting a current state of charge (SOCact) of the energy storage device (BAT);
defining a period of time (ΔT0) during which the energy storage device (BAT) cannot be charged and the plurality of uncontrollable energy consumers (HH) are supplied with energy from the energy storage device;
calculating a lower limit value (SOChigh) of the state of charge of the energy storage device (BAT) by multiplying energy demand of the plurality of uncontrollable energy consumers (HH) during the specified period of time (ΔT0) by the discharge efficiency of the energy storage device (BAT);
operating the at least one controllable energy consumer (WP) with energy from the energy storage device (BAT) if the current state of charge (SOCact) of the energy storage device (BAT) is greater than the determined lower limit value (SOChigh) of the state of charge; and
operating the at least one controllable energy consumer (WP) with energy from the net if the current state of charge (SOCact) of the energy storage device (BAT) is less than or equal to the determined lower limit value (SOChigh) of the state of charge.

2. The method according to claim 1, wherein the at least one controllable energy consumer is a heat pump (WP).

3. The method according to claim 2, wherein the energy system (1) further comprises a photovoltaic system (PV) configured to supply energy to the energy consumers (HH, WP) and the energy storage device (BAT).

4. The method according to claim 3, wherein the energy storage device (BAT) can only be charged by the photovoltaic system (PV).

5. The method according to claim 1, wherein the energy system (1) further comprises a photovoltaic system (PV) configured to supply energy to the plurality of uncontrollable energy consumers (HH), the at least one controllable energy consumer (WP) and the energy storage device (BAT).

6. The method according to claim 5, wherein the energy storage device (BAT) can only be charged by the photovoltaic system (PV).

7. The method according to claim 5, wherein the feedback-control or control device (EMS) is connected to an internet (WWW) connection to receive a solar radiation forecast for determining energy generation by the photovoltaic system (PV).

8. The method according to claim 1, wherein the feedback-control or control device (EMS) is configured to log consumption data of the plurality of uncontrollable energy consumers (HH) in order to determine or estimate an energy demand of the plurality of uncontrollable energy consumers (HH) on the basis of the logged data.

9. The method according to claim 1, wherein the at least one controllable energy consumer (WP) is connected to the net connection point (NAP) via a separate electricity meter.

10. An energy system (1) in a building, comprising:
a plurality of uncontrollable energy consumers (HH),
at least one controllable energy consumer (WP),
an energy storage device (BAT) having a discharge efficiency,
a net connection point (NAP) through which energy can be drawn from a net and/or fed into the net, and
a feedback-control or control device (EMS) designed to feedback-control or control the at least one controllable energy consumer (WP) and the energy storage device (BAT),
wherein the plurality of uncontrollable energy consumers (HH) cannot be switched on or off by the feedback-control or control device,
wherein the at least one controllable energy consumer (WP) can be switched on and off by the feedback-control or control device,
wherein the plurality of uncontrollable energy consumers (HH) is configured to draw energy from the net or from the energy storage device (BAT), and
wherein the feedback-control or control device (EMS) is configured to:
detect a current state of charge (SOCact) of the energy storage device (BAT);
define a period of time ($\Delta T0$) during which the energy storage device (BAT) cannot be charged and the plurality of uncontrollable energy consumers (HH) are supplied with energy from the energy storage device;
calculate a lower limit value (SOChigh) of the state of charge of the energy storage device (BAT) by multiplying energy demand of the plurality of uncontrollable energy consumers (HH) during the defined period ($\Delta T0$) by the discharge efficiency of the energy storage device (BAT);
operate the at least one controllable energy consumer (WP) with energy from the energy storage device (BAT) if the current state of charge (SOCact) of the energy storage device (BAT) is greater than the determined lower limit value (SOChigh) of the state of charge; and
operate the at least one controllable energy consumer (WP) with energy from the net if the current state of charge (SOCact) of the energy storage device (BAT) is less than or equal to the determined lower limit value (SOChigh) of the state of charge.

11. The energy system (1) according to claim 10, further comprising a photovoltaic system (PV) configured to supply energy to the plurality of uncontrollable energy consumers (HH), the at least one controllable energy consumer (WP) and the energy storage device (BAT).

12. The energy system (1) according to claim 10, wherein the at least one controllable energy consumer is a heat pump (WP).

13. The energy system (1) according to claim 11, wherein the at least one controllable energy consumer is a heat pump (WP).

* * * * *